United States Patent [19]
McCanney

[11] 3,845,572
[45] Nov. 5, 1974

[54] MODULAR VEHICLE TRAINER SOUND SYSTEM HAVING A PLURALITY OF SEPARATELY CONTROLLABLE SOUND GENERATORS AND A POLYPHONIC SPEAKER ARRAY

[75] Inventor: Neil R. McCanney, Binghamton, N.Y.

[73] Assignee: The Singer Company, Binghamton, N.Y.

[22] Filed: Aug. 2, 1972

[21] Appl. No.: 277,395

[52] U.S. Cl. .................................. 35/11, 35/129
[51] Int. Cl. ........................................... G09b 9/02
[58] Field of Search.......... 35/1, 12 Q, 12 T, 11, 10, 35/10.2, 12 D, 12 K, 12 W; 179/100.25, 1 GQ; 340/384 R, 384 E; 84/DIG. 1

[56] References Cited
UNITED STATES PATENTS

| | | | |
|---|---|---|---|
| 2,521,405 | 9/1950 | Phelps | 35/12 Q X |
| 2,898,587 | 8/1959 | Nye | 35/12 Q X |
| 3,008,000 | 11/1961 | Morchand | 35/11 X |
| 3,057,083 | 10/1962 | Franck | 35/12 Q |
| 3,107,438 | 10/1963 | Church et al. | 35/12 Q |
| 3,283,418 | 11/1966 | Brewer et al. | 35/11 |
| 3,504,364 | 3/1970 | Abel | 340/384 E |
| 3,718,987 | 3/1973 | Carver | 35/12 Q |

Primary Examiner—Wm. H. Grieb
Assistant Examiner—Vance Y. Hum
Attorney, Agent, or Firm—John C. Altmiller; James C. Kesterson

[57] ABSTRACT

A modular quadraphonic sound system for use in vehicle trainers is shown. Sounds to be simulated are broken down as to mechanical source and separate voltage controlled sound generators and voltage controlled attenuators provided for each sound. Sounds are then added and proportionately provided to those of the speakers which will best simulate their source direction. Control of the system is through a digital computer having stored therein a mathematical model of the sound profile of the vehicle. Design is such that hardware is shared for those sounds which cannot occur simultaneously.

12 Claims, 6 Drawing Figures

MODULAR VEHICLE TRAINER SOUND SYSTEM HAVING A PLURALITY OF SEPARATELY CONTROLLABLE SOUND GENERATORS AND A POLYPHONIC SPEAKER ARRAY

BACKGROUND OF THE INVENTION

This invention relates to vehicle trainers in general and more particularly to an improved sound system for use in such trainers.

Over the years the demand for realism placed on vehicle trainers, particularly simulators for military and large commercial aircraft, has grown. Such simulators in addition to providing realistic cockpit mockups with controls and instruments now must also provide visual, aural and motion cues for training a pilot. Various attempts have been made to develop a satisfactory sound system for use in such trainers and simulators. These have basically included sound generation apparatus such as that disclosed in U.S. Pat. No. 3,483,634 granted to L. A. Staples on Dec. 16, 1969 and assigned to the same assignee as the present invention, and systems using prerecorded sounds obtained from the actual aircraft. Neither of these types of systems have been completely successful. Thus there is a need for a realistic sound system for use in trainers and simulators.

SUMMARY OF THE INVENTION

The present invention solves the need for a realistic sound system. The approach taken, which is that of a modular design, permits the system to be configured to simulate the sounds of any one of a plurality of aircraft.

In order to provide more realistic aural simulation for an aircraft, the sound sources generally associated with that aircraft are first identified. These will in most cases include engine sounds, air sounds, land noises, such as tire screech on landing, landing gear noises, etc., and tactics sounds such as gun and rocket fire in a military aircraft. Through theoretical analysis and analysis of tape of actual aircraft operation the frequencies and amplitudes of the various sounds may be found. Additionally the direction from which the sounds emanate may also be determined.

The system of the present invention which synthesizes such sounds for presentation to a trainee in a simulator can be broken down into a number of basic components. First there are voltage-controlled oscillators which will produce the recurrent frequencies found in each of the sound sources. The amplitudes of these frequency signals are then controlled by voltage controlled amplitude controllers to obtain the desired sound levels. The frequency and amplitude controlled signals representative of a sound are then provided to sound transducers. In regard to the generation of these frequencies the present system attempts to break sounds down to the level of the mechanical device which causes them. This means that rather than have a single engine sound source each of the compressors and turbines in the engine is simulated resulting in a more realistic sound.

Since the most realistic means of providing the sound to the trainee is to give him cues not only as to frequency and amplitude but also source direction, a quadraphonic sound system with right, left, fore, and aft transducers is used. This requires then an additional step of dividing, with controllable means, the signals from each source between the four transducers and then adding all signals which must emanate from a particular transducer and providing it thereto.

Thus a plurality of frequencies at predetermined amplitudes will be generated, then divided as to source and all sound for a given source added and provided to a transducer. Thus basic building blocks may be configured to provide proper sounds of complex makeup from he proper directions.

Of course the sounds do not remain constant during a flight. This requires that means be provided to control the occurrence, frequency, amplitude and source of the sounds during a simulated flight. As previously mentioned, the oscillators, amplitude controllers and dividers are all controllable by an external voltage. Thus, a mathematical model of the sound profile of the aircraft is constructed and stored in a digital computer. As is well known to those skilled in the art, contemporary digital computer flight simulators include a digital computer which receives input signals representing trainee operations or activation of a number of dummy aircraft controls. The simulator also receives various other input signals representing such factors as simulated wind velocity and direction. The computer is programmed to solve a large number of equations which express aircraft operation and provide output signals representing various simulated flight parameters and conditions. Various digital signal outputs are then converted to analog form to drive various indicators in the simulator cockpit, while other digital outputs are used in Boolean (on-off) form to control various other indicators such as lights. For example, signals representing most or all of the simulator quantities which are calculated or used in the calculations may be provided externally of the computer for use in controlling appropriate indicators, or, as in the case of the present invention, for controlling sound simulation equipment as the simulated aircraft proceeds on a simulated flight. These calculated quantities of course, may vary during the simulated flight. For example, as the aircraft engine is started an output will cause an oscillator to provide a desired frequency. Another output will control amplitude controllers associated therewith and still others will cause the sound to be split between proper channels. As RPM increases, the control signal will cause frequency and amplitude to increase. In a similar manner other sounds are generated and controlled.

Additionally the system permits time sharing of some portions. Certain sounds such as landing gear operation, tire screech, ground rumble, etc., never occur at the same time. This permits the same oscillator, etc., to be used to generate various of the sounds under control of the computer. The design of the oscillators in the system, as will be evident from the detailed description below, also provides the capability of providing different shapes of waveform thus making it possible to duplicate required harmonic content more easily.

DESCRIPTION OF THE PREFERRED EMBODIMENT

Figure 1:
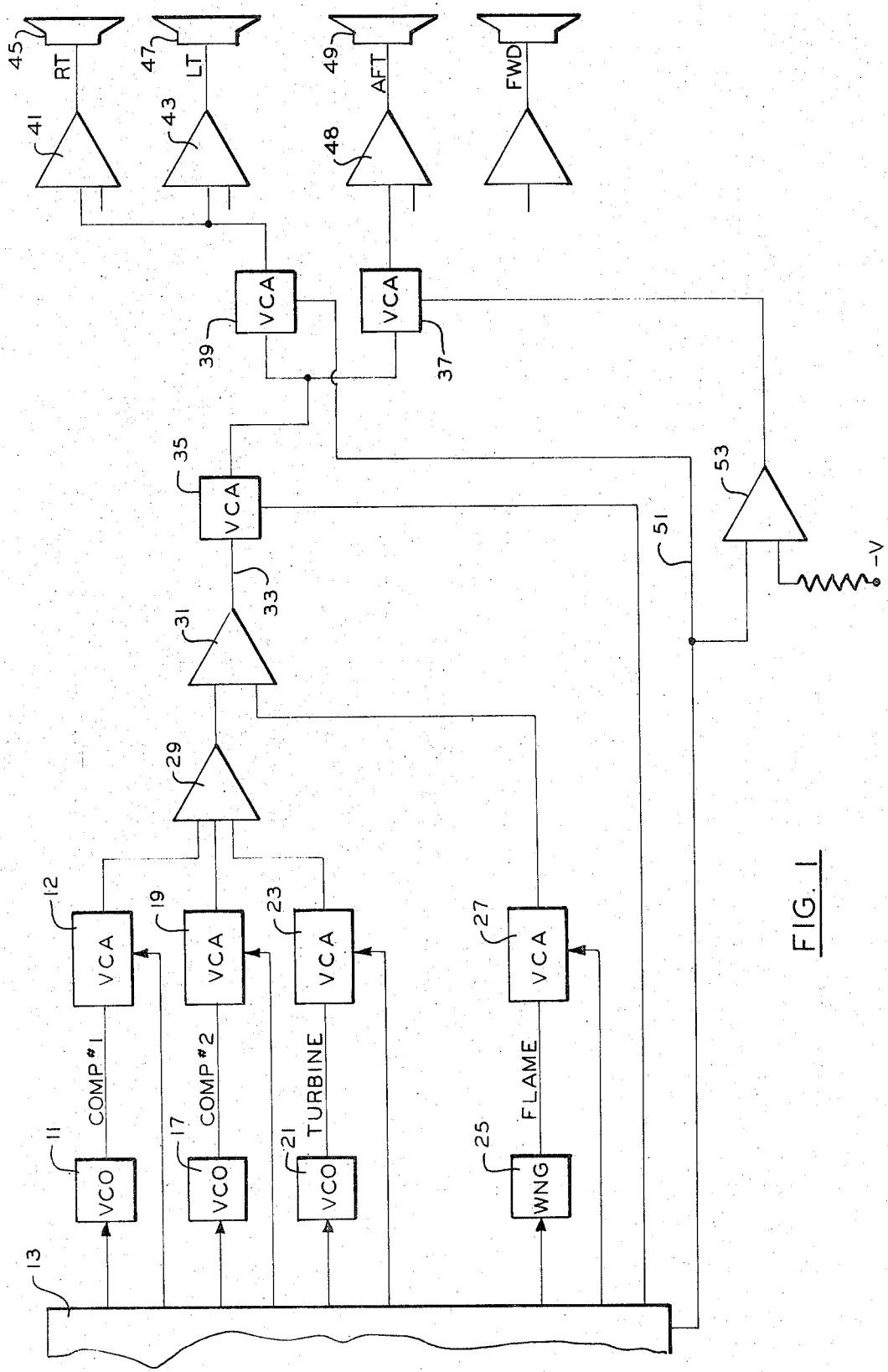
FIG. 1 is a block diagram of the portion of the preferred embodiment used to simulate engine sounds.

From a physical standpoint engine noise is probably most easily understood. In a typical jet engine there are two compressors and a turbine which contribute to the sounds generated. Additionally, fuel combustion particularly in the afterburners, will contribute to total engine sound. To implement these sounds a separate frequency generator and amplitude controller are provided for each of the turbines and compressor and a white noise generator and amplitude controller for the flame noise. This is shown in FIG. 1. A voltage controlled oscillator 11 obtains an input from computer 13 which controls its frequency output. The output is provided to an amplitude controller 12, for example a voltage controlled attenuator, which also has a voltage control input from computer 13. The final output of controller 12 represents the sound of the first compressor. Similarly oscillator 17 and controller 19 provide the frequency and amplitude of the second compressor and oscillator 21 and controller 23 provide the frequency and amplitude of the turbine.

The voltage outputs from computer 13 are essentially functions of a value termed "NHT" which is essentially engine RPM. This value will be available in the flight simulator computer and will be used to compute the output. From actual sound data, which has been analyzed, a curve relating NHT and frequency and another curve relating NHT and amplitude are developed for each of the three components, i.e., compressor no. 1, compressor no. 2 and turbine. These are stored in the computer either in the form of a polynomial or in terms of breakpoints for a straight line approximation of the curve in which case values are found by interpolation.

Computer 13 will normally be a digital computer and will include digital-to-analog converters in order to provide the control voltages to the sound system.

The remaining engine noise is the roar caused by the engine flame. This is essentially a form of white noise of varying and controllable spectrum weight and is simulated by a source generator 25 and controller 27. The control signals provided to these devices 25 and 27 will be explained in detail below. Essentially, the signals are dependent on engine and afterburner operation.

The outputs of controllers 12, 19 and 23 are summed in amplifier 29 and the output of that amplifier summed with the flame noise from controller 27 in amplifier 31. This results in a composite engine signal on line 33. The amplitude of this composite signal is then controlled by a controller 35 which include logarithmic sections (to more accurately approximate the response of the human ear). The input to controller 35 controls the overall engine noise level in accordance basically with canopy position (i.e., open or closed as will be described in connection with FIG. 2.)

The output of controller 35 is provided to two additional controllers 37 and 39. The output of controller 39 is provided through amplifiers 41 and 43, where it is summed with sounds from other sources to right and left speakers 45 and 47 respectively. The output of controller 37 is provided through amplifier 48 to the aft speaker 49.

During subsonic operation the engine sound will appear to come from behind, and the control signals on line 51 from computer 13 controlling controller 39 will cause a level of sound from right and left speakers 41 and 43. The inverted signal through amplifier 53 will cause the major portion of the signal from controller 37 to go to aft speaker 49. As Mach 1 is approached the signal on line 51 and from amplifier 53 will cause the sound to begin to lessen from aft speaker 49 and increase from speaker 45 and 47 via controller 39. After passing through Mach 1, the aircraft will be ahead of the sound thus controller 37 will reduce the signal to speaker 49 and a reduced sound level will be provided through controller 39 to speakers 47 and 45 to simulate the sound transfer through the structure of the aircraft which will now make up the major portion of the audible sound. The control signal on line 51 is in effect a structural vs. airborne ratio, i.e., a ratio of the sound transmitted through the aircraft structure to that transmitted through the air.

Figure 2:
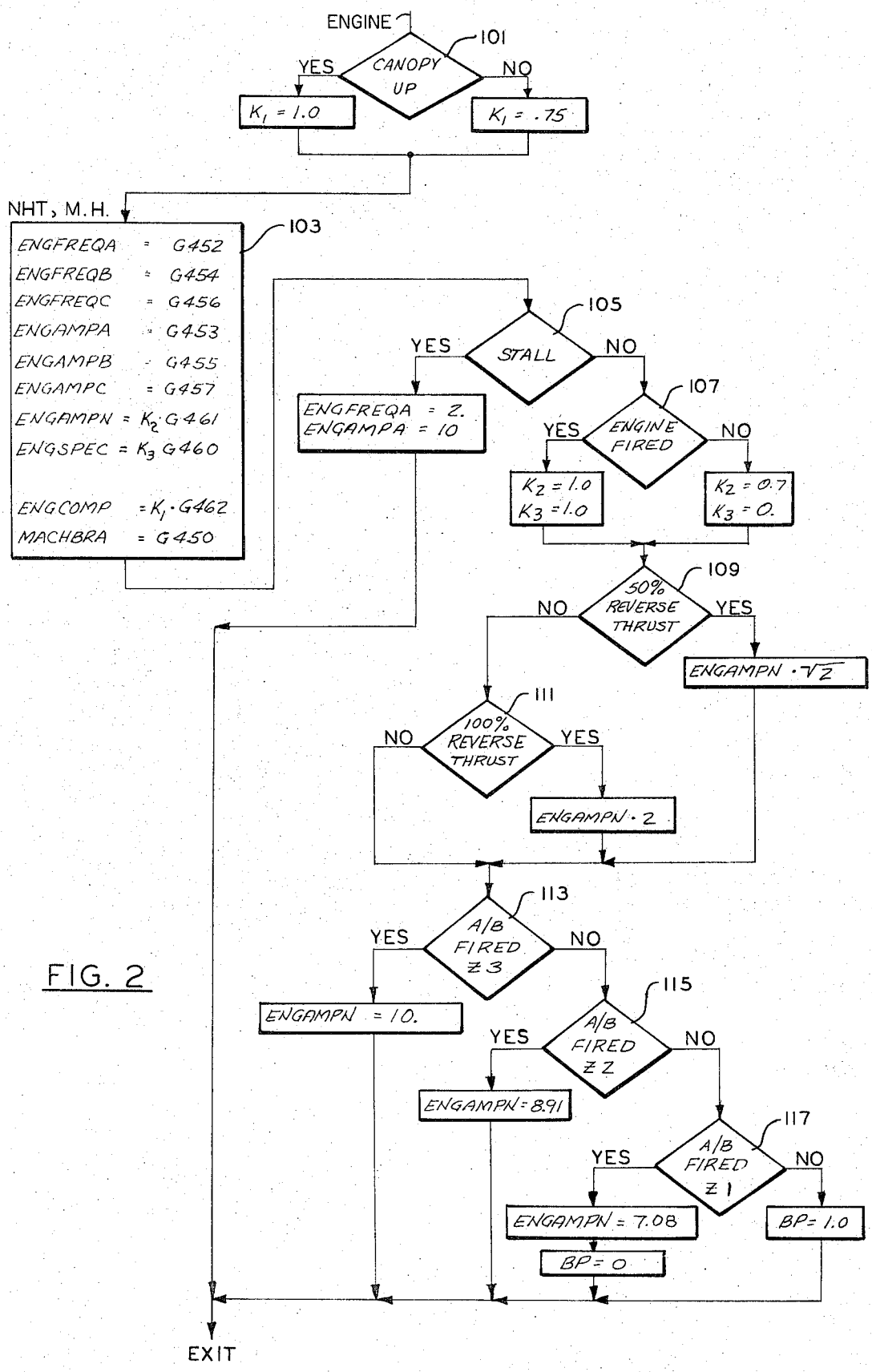
FIG. 2 is a flow diagram of a typical mathematical model for driving the system of FIG. 1.

A typical method of driving the sound system of FIG. 1 is illustrated by the flow diagram of FIG. 2. The program first encounters a decision block 101 entitled Canopy Up. The result of this decision will determine the value of a constant $K_1$ which will be 1 with the canopy up and 0.75 with it down. This constant is used later in block 103 to compute the level of the composite engine sound. Naturally the sound will be more evident with the canopy up than with it closed.

The various inputs to the blocks of FIG. 1 are then found in block 103. The symbols used herein are defined as follows:

| | |
|---|---|
| ENGFREQA | Turbine Frequency |
| ENGFREQB | 1st Compressor Frequency |
| ENGFREQC | 2nd Compressor Frequency |
| ENGAMPA | Turbine Amplitude |
| ENGAMPB | 1st Compressor Amplitude |
| ENGAMPC | 2nd Compressor Amplitude |
| ENGAMPN | Flame Amplitude |
| ENGSPEC | Spectrum Weight of the Engine Flame |
| ENGCOMP | Composite Engine Amplitude |
| MACHBRA | Transonic and Supersonic Structural vs. Airborne Ratio Function |

As previously mentioned, the frequencies and amplitudes are functions of NHT (except ENGCOMP which is a function of canopy position and MACHBRA which is a function of Mach Number). They will be computed and stored in the computer at locations designated by the numbers in block 103. The ENGCOMP value is multiplied $K_1$ discussed above. The flame terms (ENGAMPN and ENGSPEC) are each multiplied by a constant the reason for which will be seen below.

The program goes on to block 105 to see if compressor stall has occurred. If it has, ENGFREQA and ENGAMPA are set to constant values and the program exited. If not stalled, a check is made at block 107 to see if the engine if fired. (It should be noted that the engine may be turning and emitting sound but not fired.) If it is, the $K_2$ and $K_3$ which respectively multiply ENGAMPN and ENGSPEC, the flame sound controls, are set to 1. If not, $K_2$ is set to 0.7 and $K_3$ to 0 to simulate the sound when the engine is not fired.

The next two decisions relate to reverse thrust. If reverse thrust is being used, more sound is directed toward the cockpit causing an increase in sound level. Thus, if block 109 indicates that 50% reverse thrust is being used, the flame amplitude ENGAMPN is multiplied by the $\sqrt{2}$. Similarly a "yes" answer from block 111 indicating 100% reverse thrust will cause ENGAMPN to be multiplied by 2. The next group of decisions relate to afterburner operation. The program checks in block 113 to see if the after-burner is fired in Zone 3. If so, ENGAMPN is set to 10. If not, the program goes to block 115 to check Zone 2. If Zone 2 is fired, ENGAMPN is set to 8.91. If not, block 117 is entered to check zone 1. If zone 1 is not fired, the value BP is set to 1. If zone 1 is fired, ENGAMPN is set to 7.08 plus .86 BP and then BP is set to zero. The purpose of BP can be seen by tracing the afterburner operation through its normal cycle. Before firing any afterburners BP will equal 1 and ENGAMPN will be the value computed in block 103 to provide a normal flame sound. When the afterburner is fired (zones are fired in order that zone 1 will fire first), two things occur: there is a short duration pop and an increased sound level. When the program goes through block 117, the first time after firing, BP will be 1 and the level of ENGAMPN will be 7.08 + .86 BP. But on the next and subsequent passes, until the afterburner is no longer fired, BP will be 0 and ENGAMPN 7.08. Thus the .86 on the first pass will cause a pop. The firing of Zones 2 and 3 will then only increase the sound level as there is no pop associated with them.

The above description of the engine sound simulation illustrates a number of the basic principles of the system including obtaining high fidelity by simulating each engine component separately, and the splitting of the sound between the various channels of the quadraphonic system dependent on various conditions. One other basic characteristic, that of the ability to time share is not illustrated by the engine simulation. Since the engines operate at all times, their simulation must be continuous. But other sounds occur at different times and it is possible with the present system to use common hardware to simulate various different sounds where in previous systems separate hardware was used to generate each individual sound.

One of the best examples of this capability is in the simulation of what are designated LAND sounds. The occurrence of these sounds can best be seen by following a simulated flight. First, on the ground, the ground-cart will be heard. Next, as the plane taxis and takes off, a ground rumble occurs. After take-off, the sound of the landing gear coming up will be heard. On landing, the gear will be heard going down, then tire screech, and ground rumble again. It can be seen that each of these sounds occurs at a different time. The present system uses this fact and a novel hardware arrangement to simulate these sounds at a minimum cost.

Figure 3:
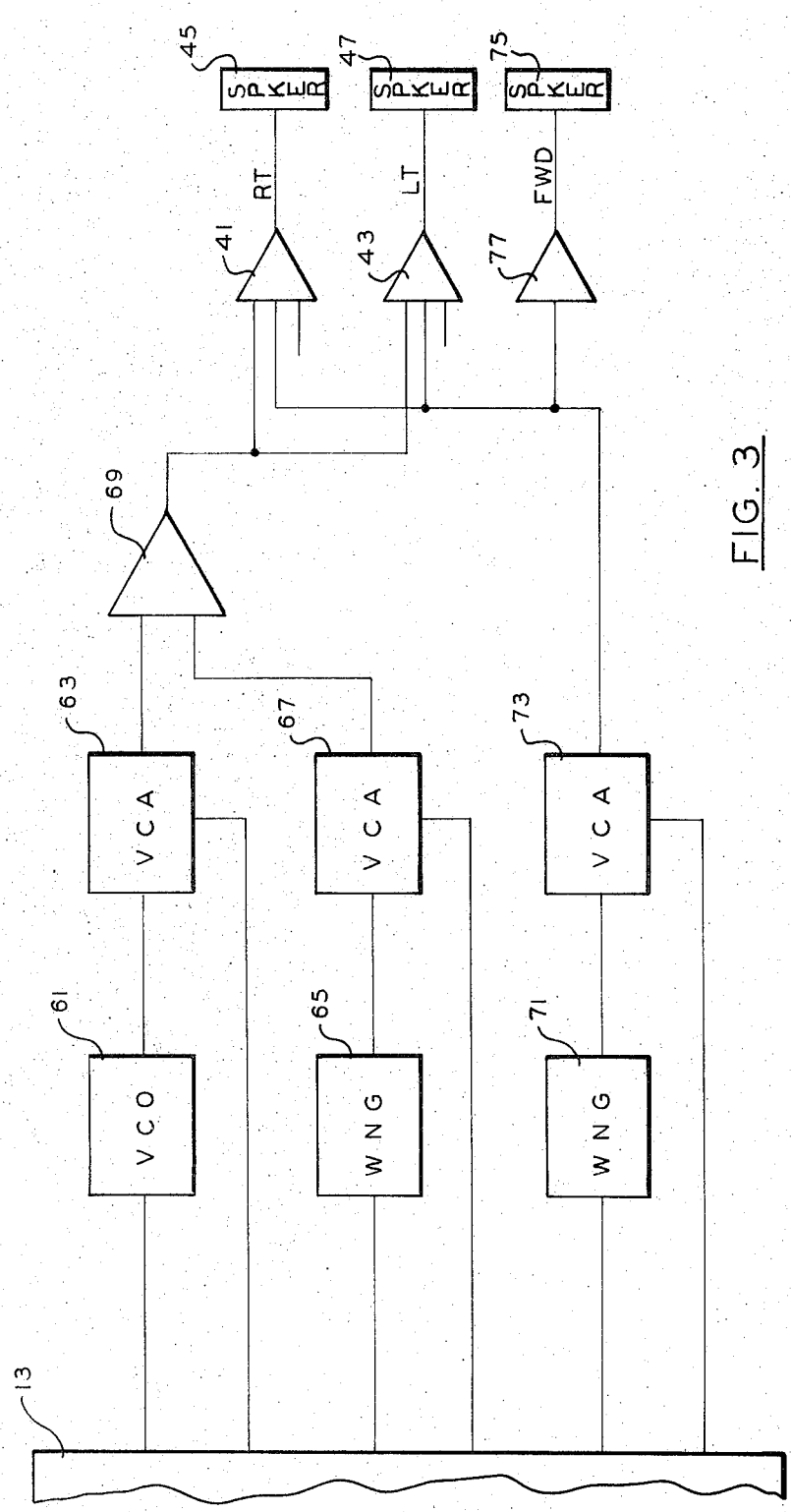
FIG. 3 is a block diagram of the portion of the preferred embodiment used to simulate land sounds.

As with the engines, two general types of sounds occur: those having recurrent parts and those in the nature of random parts or white noise. Thus, in this portion of the system, as illustrated by FIG. 3, there is provided a voltage controlled oscillator 61 and associated amplitude controller 63 and a white noise source 65 and its associated controller 67. The two controller outputs are summed in an amplifier 69 and distributed to left and right speakers 45 and 47 via amplifiers 41 and 43 as described above.

Additionally there is shown on FIG. 3 the aero or air sound generator which generates the sound of the aircraft moving through the air. The air noise is provided by a white noise generator 71 and its amplitude controlled by controller 73 which also provides a logarithmic conversion to provide more linear, and thus better control of, altitude corrections since the density variations with altitude of the atmosphere (the real world) is of a logarithmic nature. The output is then distributed to the right speaker 45, the left speaker 47 and the forward speaker 75 via summing amplifiers 41, 43 and 77 respectively.

As shown on FIG. 3, the land sounds are distributed via amplifiers 41 and 43 to the right and left speakers 45 and 47. However it should be recognized that additional controllers, such as those described in connection with FIG. 1 for the change in sound due to Mach Number may be provided to further control sound direction.

Figure 4:
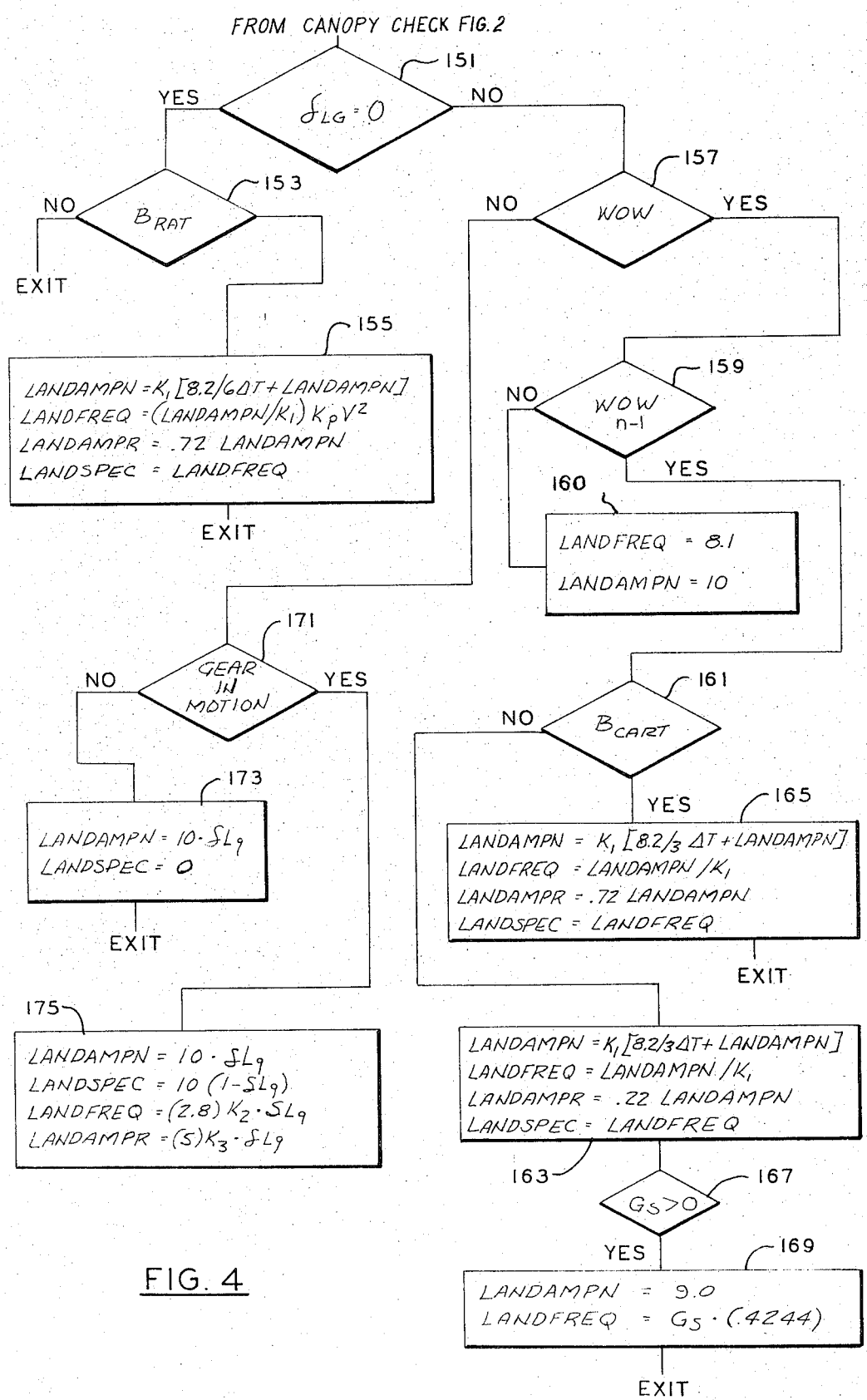
FIG. 4 is a flow diagram of a typical mathematical model for driving the system of FIG. 3.

The aero noise and amplitude are designated respectively AEROSPEC and AEROCOMP. Typical equations for these are as follows:

AEROSPEC = $1 - \sin \delta$ + Buffet
AEROCOMP = $|.875 - 00001875h + .125(CREE/h)| 2 m$ where
$\alpha$ = the angle of attack
$h$ = altitude
$M$ = Mach
CREF = Ground reflection constant The control of the land sounds is illustrated by the flow diagram of FIG. 4. The four functions in FIG. A are designated as follows:

LANDFREQ = The recurrent frequency associated with a land sound
LANDAMPR = The amplitude associated with LANDFREQ.
LANDSPEC = Control of the spectrum weights of land sounds
LANDAMPN = The amplitude of LANDSPEC As in the engine computations of FIG. 2, the canopy position is first checked and $K_1$ set accordingly. The value $\delta$ LG which is the percent of landing gear extension is checked in block 151. If zero, i.e., gear up, check is made of $B_{RAT}$, the ram air turbine, in block 153, to see if it is extended. If not the program is exited. If the ram air turbine is extended the four values are set as indicated in block 155 and the program exited.

If the answer in block 151 is no, i.e., gear is not all the way up, a check is made of block 157 to see if there is weight on wheels. If there is, a check is made in block 159 to see if there was weight on wheels the last time. If not the tire have just touched down and wheel screech is required. Thus LAND FREQ and LAND AMPN are set as shown in block 160. The next time through, block 159 will indicate yes so that the sound will only last a short time.

If block 159 is yes, then the aircraft is solidly on the ground and a check is made in block 161 to see if the ground cart is connected. According to the answer to this question, the four values are set as indicated by blocks 163 and 165. If the cart is not connected the aircraft may be moving, so a check for ground speed greater than zero is made in block 167. If it is, LANDAMPN and LANDFREQ are set as shown to simulate ground rumble.

Returning now to block 157, when there is indicated no weight on wheels, the aircraft may be taking off or landing in which case the gear may be going up or down. This is checked in block 171. If the answer is no, the values of LANDAMPN and LANDSPEC are set as shown in block 173. If the gear is in motion, block 175 is entered. Here LANDAMPN is set equal to 10 δ Lg (δ Lg will vary from 0, when up, to 1, when down). LANDSPEC is set equal to 10 (1 − δ LG). Examination of blocks 175 and 173 shows that the two sets of equations are equivalent for a gear down position (for gear up, i.e., δ LG = 0 block 173 will never be reached), LAND FREQ = 2.8 δ LG time $K_2$ and LANDAMPR 5 δ LG times $K_3$.

$K_2$ and $K_3$ are functions which provide the sound of the latch pin dropping into place in the gear.

Figure 5:
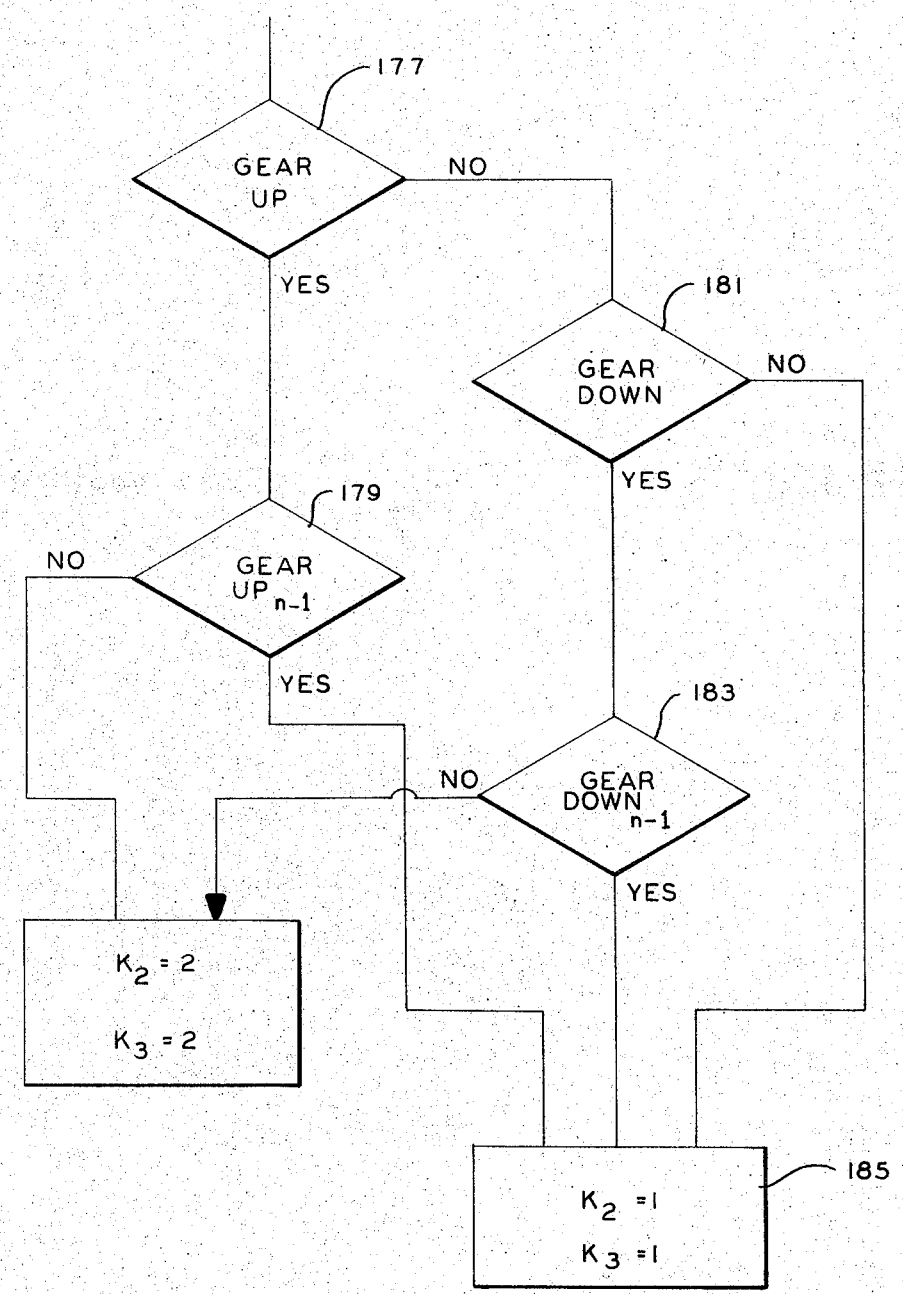
FIG. 5 is a flow diagram of logic associated with the landing gear sounds.

The computation of these functions can best be shown by the flow diagram of FIG. 5. A check is made in block 177 to see if the gear is all the way up. Then a check is made in 179 to see if it was up the last time. If not, a clunk is in order that $K_2$ and $K_3$ are set to 2. If the gear is not up, a check is made in block 181 to see if it is down and, if yes, in block 183 to see if it was down last time. If not again a clunk is needed and $K_2$ and $K_3$ are again set to 2.

If the gear has not just come all the way up or down the constants $K_2$ and $K_3$ are set to one as shown in block 185. When used in the equations of block 175 the constant, when 1, will cause a sound of gear in motion and, when they go to 2 for a short period, will cause a clunk. After the clunk block 175 will not be entered since, either block 151 will cause it to be avoided, if the gear is up, or it will enter block 173 via block 171, if the gear is down.

Figure 6:
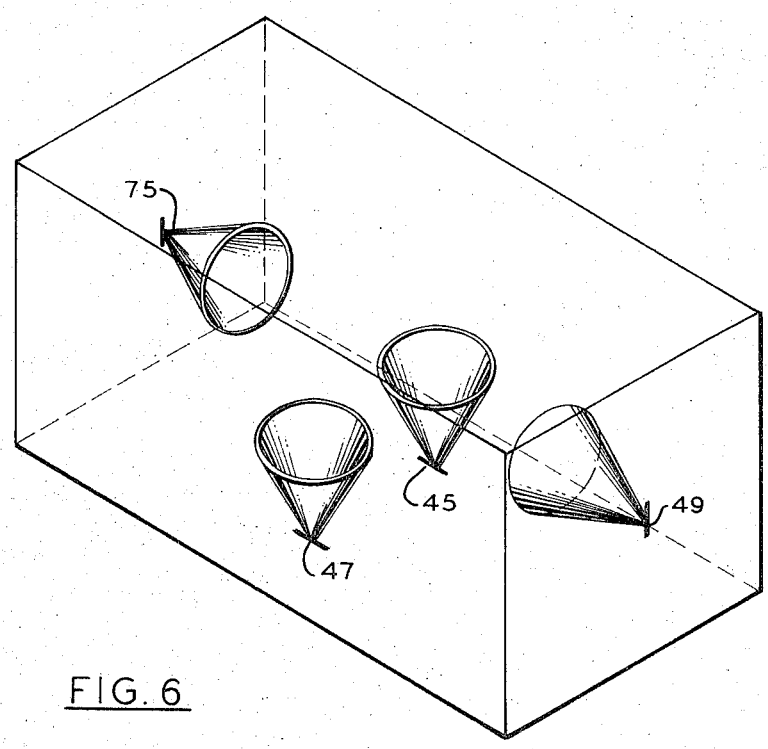
FIG. 6 is a perspective view of the preferred speaker placement in a simulated cockpit.

In FIG. 6 the placement of the sound transducers, e.g., speakers in the simulated cockpit to form the quadraphonic sound systems is shown. In a completely general system, in which individual controls is desired over each speaker, each will have associated with it an amplitude controller such as 37 and 39 of FIG. 1. Proper analysis of the actual sound source direction for each sound to be simulated then permits, by controlling the speakers, that sound to be properly simulated as to source direction.

In a manner similar to that in a stereo system where it is possible to cause a sound to appear to come from any point along the line between the two speakers involved, the arrangement shown herein allows the sound to appear to come from one of many directions. For example providing a sound to forward speaker 75 and left speaker 47 will cause an apparent sound source which is to the left and in front of and below a trainee seated in the cockpit. Addition of the same sound to right speaker 45 will cause its apparent source to center but be below and in front of speaker 75 since speakers 47 and 45 are located below speakers 75 and 49. In a similar manner other source locations may be simulated. If additional flexibility is desired additional speakers may be provided. For example if a total of eight speakers is used, one at each corner of the box of FIG. 6 a complete three dimensional system may be achieved.

Using similar techniques other sounds such as tactics sounds, sounds of rain and hail on the cockpit and additional engine sounds. For example in tactic simulation a rocket sound may be made to travel from the left wing to forward of the cockpit through use of the quadraphonic sound system in much the same way that the engine sound is shifted when passing through mach one.

Selection of the proper components is essential to system operation. All the blocks of the present system may be purchased from Wavetek of San Diego, Calif.

The voltage controlled oscillators used in the present system may be Wavetek Voltage Controlled Generators. These generators may be programmed by external connections to produce different shaped sawtooth type waveforms making it possible to more nearly duplicate various sounds by selecting a waveform that more nearly matches the harmonics required. The inputs shown as coming from the computer in the figures is a voltage control input with the generator providing a linear voltage to frequency conversion. The amplitude controllers may be Wavetek VCA modules which are essentially analog multipliers. Thus the input to these modules will be multiplied by the input control voltage.

These modules are combined as indicated in the figures above in some instances with Log Converter modules which convert a linear input voltage to a log function which is then used to control VCA. The final major type of unit is the white noise generator which may be a Wavetek PRNG (pseudo random sequence generator). In this module the control voltage controls a clock which is then used to generate random frequencies with a spectrum weight dependent on the clock frequency. Further control is possible with external timing capacitors.

A feature of the VCG not mentioned above is that of a trigger control. Through this control the output can be turned on and off by a logic level. Thus it is possible to pulse sounds on and off. This is particularly useful for example in simulating gun bursts in a tactics trainer. The proper frequency and amplitude control signals may be maintained with the trigger used to turn the sound on and off. Similarly this function can be used with short duration sounds like tire screech, etc.

It can be seen that the system has almost unlimited flexibility. It permits sounds of good fidelity to be generated, controlled and then distributed through quadraphonic sound system. The type of devices and system design used makes it possible to simulate a maximum number of sounds with a minimum of hardware. It will be obvious that various modifications may be made by those skilled in the art without departing from the spirit of the invention which is intended to be limited solely by the appended claims.

What is claimed is:

1. A sound system for use with a vehicle simulator for providing a plurality of identifiable sounds associated with mechanical devices of the simulated vehicle comprising:
   a plurality of amplitude controllable signal generator means, each of said signal generator means providing signals representative of an identifiable sound associated with a mechanical device of a vehicle to be simulated;
   summing means responsive to each of said signals provided by said plurality of amplitude controllable signal generator means for providing a first composite signal representative of the sum of said identifiable sounds;
   apportioning means responsive to first control signal inputs for receiving said first composite signal and for providing a plurality of second composite signals similar to said first composite signal, the magnitude of said second composite signals being selectively apportioned in accordance with said control signal inputs;

a trainee station representative of the control station or cockpit of the vehicle being simulated, said trainee station including a plurality of electro-acoustic devices equal in number to said plurality of second composite signals and spaced around said trainee station, each electro-acoustic device connected for generating sounds in response to one of said second composite signals; mathematical model means to provide a sound profile of the simulated vehicle and to control a plurality of amplitude controllable signal generator means; and control means for providing said first control signal inputs to said apportioning means, said control signal inputs being generated in response to signals representative of the operation of the vehicle simulator and in accordance with said mathematical model means such that at least one of said identifiable sounds provided by at least two of said electro-acoustic devices has the semblance of originating from a particular location around the trainee station different from the location of any of said electro-acoustic devices.

2. The invention according to claim 1 wherein characteristics of the output signal from at least one of said amplitude controllable signal generator means may be selectively varied and used to simulate at least two different identifiable vehicle sounds which do not occur at the same time.

3. The invention according to claim 1 wherein at least one of said amplitude controllable signal generator means comprises a voltage-controlled oscillator and a voltage-controlled attenuator, said voltage-controlled attenuator having the output of said oscillator as an input.

4. The invention according to claim 1 wherein said control means comprises a general computer programmed with said mathematical model of said sound profile of the simulated vehicle.

5. The invention according to claim 1 wherein the simulated vehicle is an aircraft and said plurality of sounds comprises engine sounds, land sounds and aero sounds.

6. The invention according to claim 1 wherein said sounds comprise a first group made up of sounds having recurrent frequencies and a second group of sounds which are made up of non-recurrent frequencies, and said plurality of signal generator means comprise at least one voltage-controlled oscillator to simulate sounds in said first group and at least one white noise generator to simulate sounds in said second group.

7. The invention according to claim 1 wherein said acoustic device are speakers.

8. The invention according to claim 1 wherein said summing means includes means for controlling the amplitude of said first composite signal.

9. The apparatus of claim 1 wherein the amplitude of signals generated by one of said plurality of amplitude controllable signal generator means is responsive to second control signal inputs provided by said control means.

10. The invention according to claim 1 wherein said amplitude controllable signal generating means comprise at least one voltage controlled oscillator to generate recurrent frequencies, at least one white noise generator to generate non-recurrent frequencies, and a plurality of voltage controlled attenuators coupled to respective ones of said oscillators and noise generators.

11. The invention according to claim 10 wherein said means to provide controls signals comprises a digital computer programmed with the sound profile of sounds to be simulated.

12. The invention according to claim 11 wherein said electro-acoustic devices include electro-acoustic devices in front of, behind, and to the right and left of a trainee in the trainee station, said apportioning means comprising a plurality of voltage controlled attenuators each having said first composite signal as an input and each providing an output to one of said electro-acoustic devices.

* * * * *

UNITED STATES PATENT OFFICE
CERTIFICATE OF CORRECTION

Patent No. 3,845,572                Dated November 5, 1974

Inventor(s) Neil R. McCanney

It is certified that error appears in the above-identified patent and that said Letters Patent are hereby corrected as shown below:

Column 1, line 38, after "tape" insert --recordings--.

Column 6, line 52, "tire" should be --wheels-- and "wheel" should be --tire--.

Column 10, line 13, before "acoustic" insert --electro--.

Signed and sealed this 4th day of March 1975.

(SEAL)
Attest:

RUTH C. MASON
Attesting Officer

C. MARSHALL DANN
Commissioner of Patents
and Trademarks